United States Patent [19]

Lindsey et al.

[11] 3,714,587

[45] Jan. 30, 1973

[54] LINEAR PULSE COUNTER APPARATUS

[75] Inventors: Carl B. Lindsey, China Lake; Joe A. McKenzie, Ridgecrest, both of Calif.

[73] Assignee: The United States of America as represented by the Secretary of the Navy

[22] Filed: March 20, 1972

[21] Appl. No.: 236,286

[52] U.S. Cl. ....................328/41, 328/183, 307/220, 307/273

[51] Int. Cl. ..........................................H03k 21/00

[58] Field of Search........328/41, 129, 193, 195, 183, 328/207; 307/220, 225, 273; 332/11

[56] References Cited

UNITED STATES PATENTS

| | | | |
|---|---|---|---|
| 3,509,367 | 4/1970 | Orsen | 328/183 |
| 3,548,317 | 12/1970 | Bordonaro | 328/183 |
| 3,586,877 | 6/1971 | Ardias | 328/183 |
| 3,621,281 | 11/1971 | Hagen | 328/183 |

*Primary Examiner*—Herman Karl Saalbach
*Assistant Examiner*—R. E. Hart
*Attorney*—R. S. Sciascia et al.

[57] ABSTRACT

Incoming pulses are applied to a retriggerable, monostable multivibrator which produces an output pulse having a pulse width substantially equal to 1.5 times the nominal period of the pulse rate. The multivibrator is retriggered every time an incoming pulse is received and the output thereof switches a constant current source on or off to thereby charge and discharge in a linear fashion an integrating capacitor. Threshold detector means produce an output count when the charge on the capacitor equals or exceeds a predetermined value corresponding to the reception of at least three out of five pulses.

3 Claims, 6 Drawing Figures

LINEAR PULSE COUNTER APPARATUS

BACKGROUND OF THE INVENTION

Prior art pulse counters, in general, included such components as boxcar generators, step generators, and integrators in circuit configurations which utilized fixed pulse width generators coupled to integrating capacitors. In operation, these counters had to reset at the same rate as they set themselves thereby resulting in non-linearities which made the counter accuracy very poor. Furthermore, the pulse width required for these counters was very stringent and they also produced much transient noise. Digital up-down counters were also used in the prior art; however, as is known to those skilled in the art, such counters become very complex for counts greater than eight and even more complex if the count required is not a direct power of two.

SUMMARY OF THE INVENTION

Linear apparatus for producing a highly accurate pulse count for a given pulse rate even when jitter is present are disclosed. The apparatus comprises relatively simple circuitry which provides an output count if three or more pulses out of five are detected. In operation, an incoming pulse triggers a retriggerable, monostable multivibrator whose output pulse switches on a constant current source. The output of the current source charges an integrating capacitor in a linear fashion. The multivibrator output pulse has a pulse width substantially equal to 1.5 times the nominal period of the pulse rate, and if a second incoming pulse occurs before the output pulse ends, the timing period begins again from the second pulse. An amplifier switch connected to the output of the multivibrator switches the current source on and off according to the output state of the monostable. When the current source is on, the capacitor charges in a linear fashion and when the current source is turned off, the capacitor discharges at a linear rate until its potential is slightly below zero volts. Threshold detector circuitry produces an output count when the charge on the capacitor exceeds a selectively predetermined value corresponding to the occurrence of at least three of five incoming pulses.

OBJECTS OF THE INVENTION

It is the primary object of the present invention to provide pulse counting circuitry which can provide a highly accurate pulse count for a given pulse rate even when jitter is present.

Another object of the present invention is to provide pulse counter apparatus which generate relatively little noise to thereby provide a highly accurate count.

Other objects of the invention will become apparent from the following detailed description of the invention when considered in conjunction with the accompanying drawings.

DESCRIPTION OF THE PREFERRED EMBODIMENT

Figure 1:
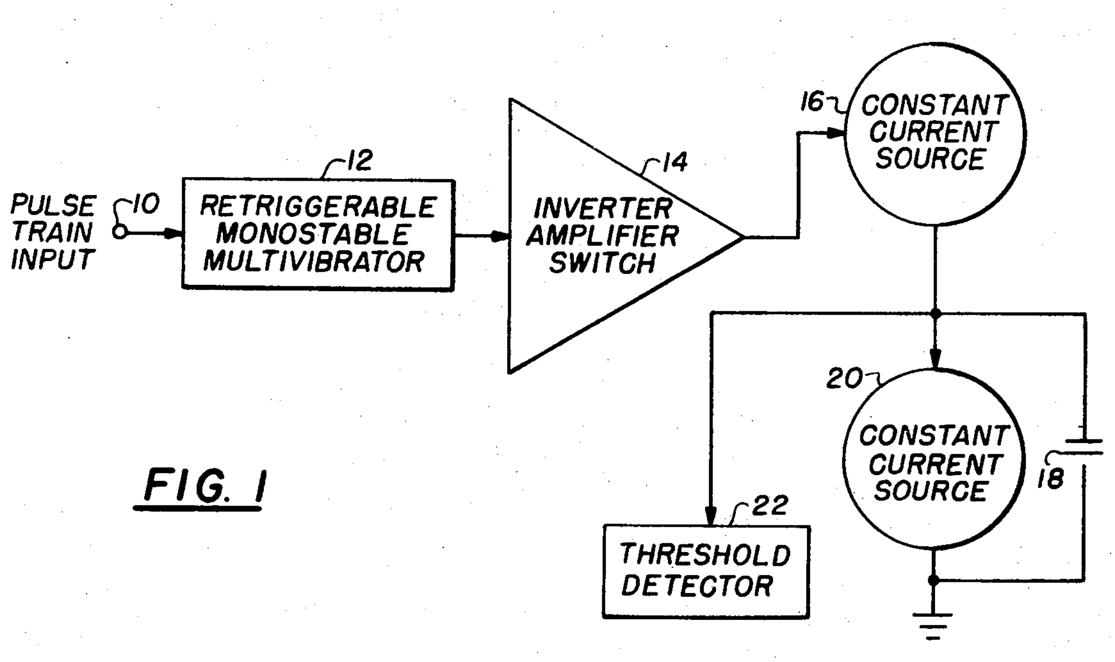
FIG. 1 is a simplified block diagram of apparatus embodying the inventive concept to be disclosed hereinafter.

FIG. 1 is a simplified block diagram of apparatus embodying the novel pulse counting concept to be disclosed herein. The circuit comprises input terminal means 10 for receiving incoming pulse trains and for coupling same to a retriggerable monostable multivibrator 12. Connected to the output of the multivibrator is an inverting amplifier switch 14 which couples the multivibrator output to a constant current source 16 having a current magnitude of 2J. Connected to the output of the constant current source 16 is an integrating capacitor 18. A constant current source 20 having a current magnitude of J is connected in parallel with the capacitor 18. The output of the capacitor is coupled to the threshold detector 22.

Figure 2:
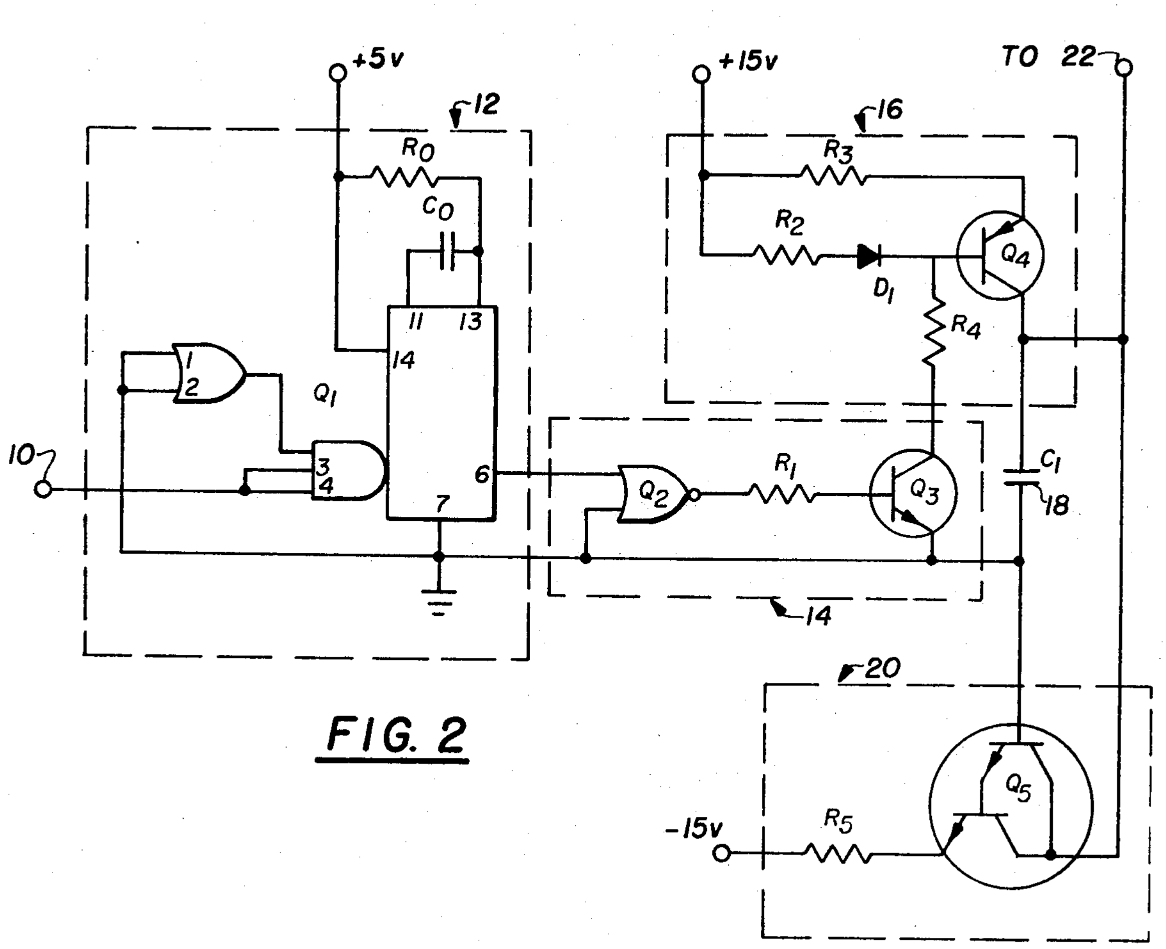
FIG. 2 is an electrical schematic diagram of the apparatus shown in FIG. 1.

FIG. 2 is an electrical schematic representation of the apparatus of FIG. 1. The retriggerable monostable multivibrator 12 can comprise an integrated circuit whose output remains high as long as input pulses are present to retrigger the circuit. The resistor $R_o$ and the capacitor $C_o$ comprise a timing circuit, and their respective values are chosen such that the period of the monostable (i.e., pulse width) is, for example, 1.5 times as great as the nominal period of the incoming pulse rate. $R_o$ and $C_o$ should be stable components for the design temperature range.

The inverter amplifier switch 14 comprises a two-input NOR gate $Q_2$ which functions as an inverter and buffer and could comprise a diode-transistor logic device. The resistor $R_1$ is a conventional current limiting resistor which protects the base of the transistor $Q_3$ which is a switch which functions conventionally to turn the constant current source 16 on or off.

The constant current source 16, which has a magnitude of 2J, comprises resistors $R_2$, $R_3$, and $R_4$, diode $D_1$, and transistor $Q_4$. The resistors $R_2$ and $R_4$ are precision resistors which form a voltage divider when transistor $Q_3$ is on. This divider provides the reference voltage to generate a constant current having a magnitude of 2J. The diode $D_1$ can be a silicone diode which is forward biased when $Q_3$ is on. This diode provides a voltage drop which is substantially equal to the base emitter drop of transistor $Q_4$, and furthermore, it also provides temperature compensation for variations in the base emitter potential variations of $Q_4$. Resistor $R_3$ is a precision resistor which determines the value of the constant current 2J when $Q_3$ is on. The transistor $Q_4$ functions as a constant current source 2J when $Q_3$ is on.

The constant current source 20 comprises the transistor $Q_5$ which can be a dual silicone transistor connected in the Darlington configuration. The transistor forms a constant current source J in combination with the resistor $R_5$; thus as long as the potential across the capacitor 18 is greater than zero it functions as a constant current source, but when the potential drops below zero the transistor saturates and the resulting potential remains constant. Resistor $R_5$ is a precision resistor which determines the magnitude J of the constant current source 20 for a given negative supply voltage (e.g., −15 volts).

The integrating capacitor 18 can comprise a metalized-polycarbonate device which, as is well known to those skilled in the art, is a very stable capacitor over the operating temperature range of −55°C to +125°C. The voltage across this capacitor is either a linearly increasing or decreasing potential depending on whether $Q_3$ is on or off as will be described hereinafter.

The threshold detector 22 should have a very high impedance below threshold and the current requirements at threshold should be minimized. For example, a differential comparator uA710 or equivalent can be used effectively as can a high reverse-leakage Zener diode (1N5200 series).

By way of illustration, the following components could be used in the circuit of FIG. 2 with the exemplary count and frequency described above:

$Q_1$ – UA9610
$Q_2$ – MC1911
$Q_3$ – 2M2222
$Q_4$ – 2N3799
$Q_5$ – 2N2913
$R_1$ – 12K, ¼ watt
$R_2$ – 4.75K, ⅛watt
$R_4$ – 21.5K, ⅛ watt
$D_1$ – 1N4148

The remaining component values can be determined for a given application, i.e., count and frequency, by the following equations:

Let $F_r$ be the nominal repetition rate pulses per count $R_o$ and $C_o$ may be calculated from equation:

$1.5 = 0.36 \times F_r \times R_o \times C_o$ where $5K < R_o < 40K$

If $2J = 200uA$, the loading on the $R_2$ and $R_4$ divider is negligible. This also means that the threshold detector current must be less than 100uA. Thus, $$R_3 = 10 \text{ volts}/2J = 50K$$

If, $V$ = threshold voltage (less than 5 volts)
$N$ = number of pulse count desired, and
$T = N \times 1/F_r$, then
$c = TJ/V$ For a count capability equal to $N$ out of 2N–1 pulses, the current source 20 will have a magnitude of $2J/2$ or $J$.

Then, $R_5 = 13.8/J = 138K$.

With the above in mind, the operation of the circuit will now be explained using the block diagram of FIG. 1 and the schematic of FIG. 2 and the exemplary graphical waveforms of FIG. 3, 4, 5, and 6.

As previously mentioned retriggerable monostable 12 is designed such that if a second incoming pulse occurs before the output pulse produced by the first incoming pulse ends, the timing period begins again from the second pulse. The pulse width of the monostable is arbitrarily set as being substantially equal to 1.5 times the normal period between applied pulses to allow a safety margin such that jitter of the time period does not adversely affect the operation of the apparatus.

The inverter amplifier switch 14 comprises an interface buffer which performs the function of turning the current source 16 on or off according to the output state of the monostable. When the upper constant current source is on the capacitor 18 charges in a linear fashion since the current source 16 provides twice the current of the source 20. When the current source 16 is turned off the capacitor discharges at a linear rate until its potential is slightly below zero volts at which time the current source 20 becomes inoperative.

The device is designed to achieve threshold at the detector 22 if three or more out of five pulses are present; if less than three pulses occur, threshold will not be reached. It can be appreciated that the above figures are merely exemplary for purposes of illustration and that other counts could be used as desired.

Figure 3:
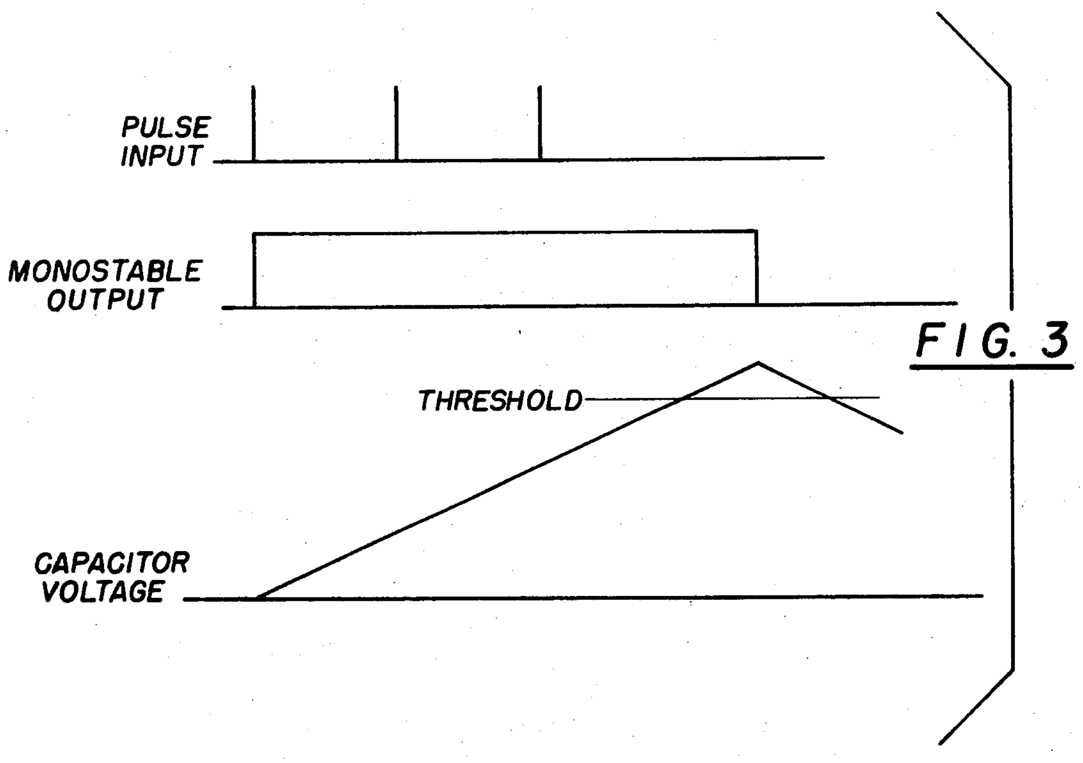
FIGS. 3, 4, 5, and 6 are graphical representations of the operation of the apparatus of FIG. 1 and FIG. 2 for several pulse occurrence conditions.

The above operation of the apparatus can be appreciated by reference to FIGS. 3, 4, 5, and 6 wherein the threshold has been set for three pulses occurring out of five. In FIG. 3 it can be seen that the pulse input comprises three out of five pulses whereby the monostable output comprises a relatively long output pulse. As a consequence the voltage on capacitor 18 is a linearly increasing voltage until the threshold level is reached. Note that FIG. 3 clearly illustrates the retriggering of the multivibrator by later pulses.

Figure 4:
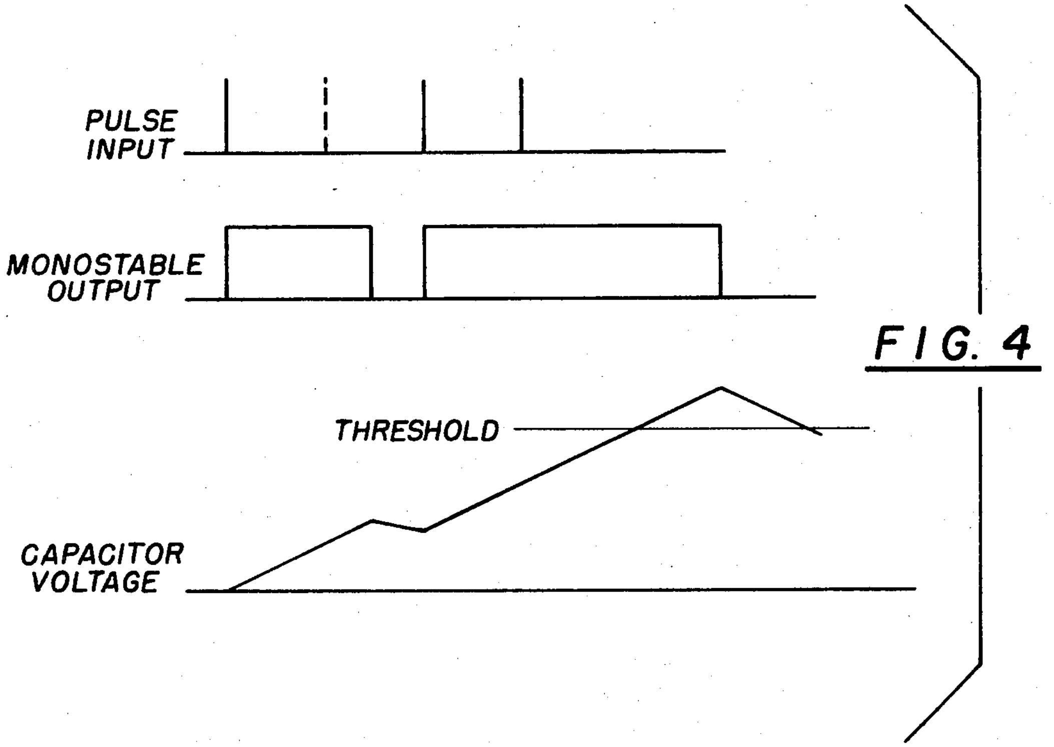

In FIG. 4, three out of four pulses are shown occurring. As can be seen, the monostable output comprises a pulse having a pulse width substantially equal to 1.5 times the nominal period followed by a longer output pulse having a width longer than 1.5 times the period because the multivibrator is re-triggered by the third pulse. Thus the capacitor voltage increases linearly, drops linearly, and then increases linearly again until the threshold level is reached.

Figure 5:
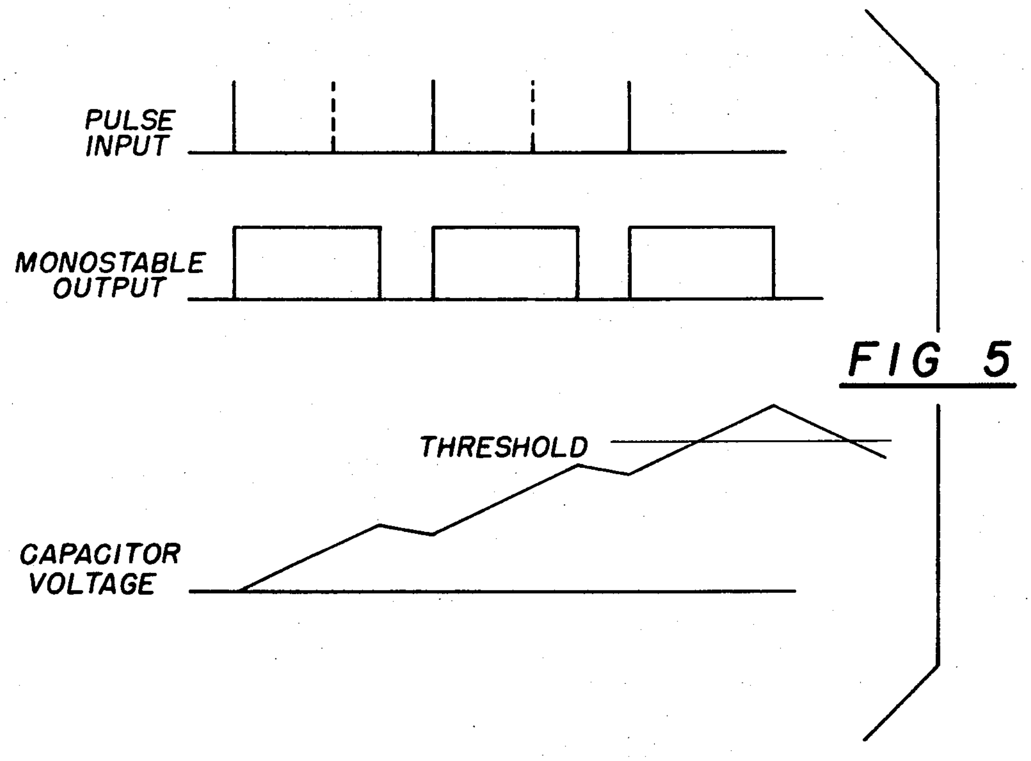

In FIG. 5, three pulses out of five are shown occurring such that the monostable output comprises three equal pulses, each having a pulse width equal to 1.5 times the nominal period of the pulse rate. As a consequence the capacitor voltage comprises a three-step, semi-triangular waveform which also achieves the threshold level in a linear manner.

Figure 6:
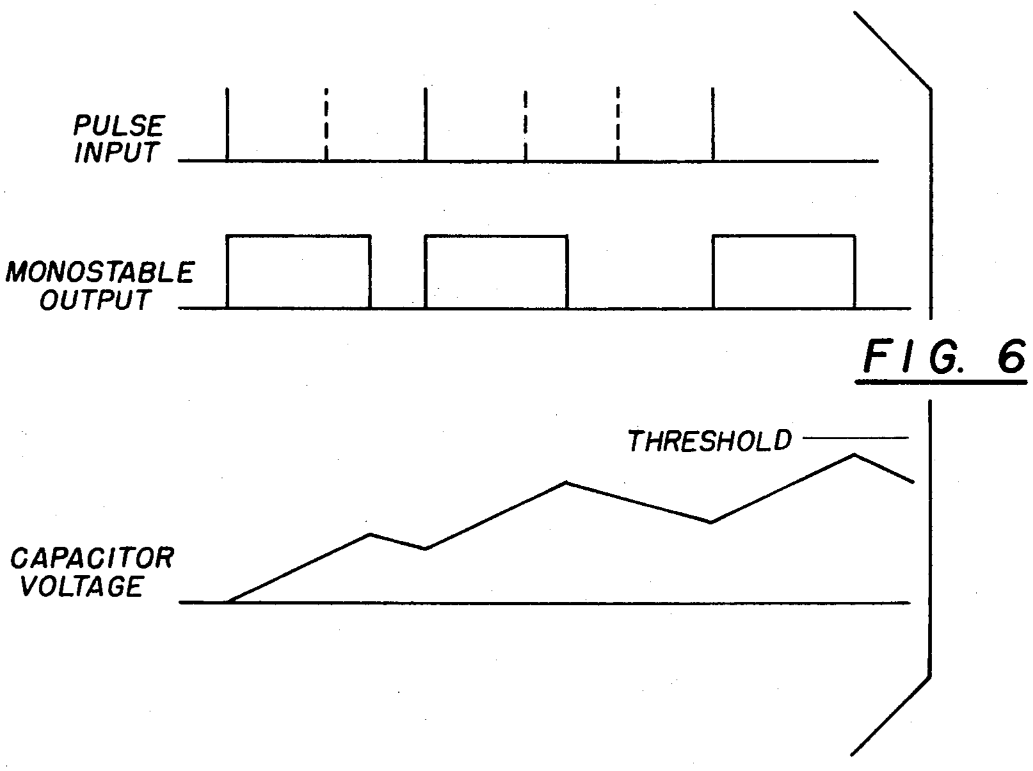

The final situation shown in FIG. 6 illustrates two pulses out of six occurring. As shown the monostable output comprises three output pulses each having a width equal to 1.5 times the nominal period. As can be seen a capacitor voltage does not exceed the threshold voltage for this illustration due to the non-occurrence of the fifth pulse.

Thus it can be seen that a new and novel pulse counter apparatus has been disclosed for use in situations where accurate pulse counts are required for a given pulse rate when jitter is present. The apparatus is simple in structure and allows output count if three or more pulses out of five occur. The apparatus is characterized by low noise generation, simplicity in structure, and high accuracy of operation. This is made possible in part by the use of the retriggerable monostable multivibrator. The linearity of the integrator further makes the accuracy fairly independent of the threshold setting over its operational range, that is, if the circuit is designed for a count of 10 with a threshold set near 5 volts, the threshold may be varied between 0.5 and 5 volts to count from one to ten and the accuracy requirements of the threshold for 10 count will be the same as for one count.

Obviously many modifications and variations of the present invention are possible in the light of the above teachings. It is therefore to be understood that within the scope of the appended claims the invention may be practiced otherwise than as specifically described. For example, any integrated circuit retriggerable monostable multivibrator may be used for $Q_1$, and any diode-transistor logic gate or inverter could be used for $Q_2$.

What is claimed is:

1. Linear pulse counter apparatus comprising:

input terminal means for receiving incoming pulses;

monostable multivibrator means connected to said input terminal means for producing an output pulse in response to an incoming pulse and having a pulse width substantially equal to 1.5 times the nominal period of the pulse rate of said incoming pulses;

said multivibrator means including means for retriggering the output thereof every time one of said incoming pulses is received;

first constant current source means;

interface buffer means connected between the output of said multivibrator means and the input of said first current source means to switch said first current source on in response to an output pulse and off in the absence of said output pulse;

integrating capacitor means connected to the output of said first current source means;

second constant current source means connected in parallel with said capacitor means, said first current source means having a current magnitude substantially equal to twice that of said second current source means;

said capacitor means being responsive to the output of said first current source to charge in a linear manner when said first current source is switched on and to discharge in a linear manner when said first current source is switched off; and, threshold detector means connected to the output of said capacitor means and being responsive thereto to produce an output count if three or more of said incoming pulses out of five trigger said multivibrator means whereby said capacitor is charged to a corresponding value by said first current source.

2. The apparatus of claim 1 wherein said interface buffer means comprises amplifier switch means.

3. The apparatus of claim 1 wherein said threshold detector means comprises differential comparator means.

* * * * *